United States Patent Office 2,729,239
Patented Jan. 3, 1956

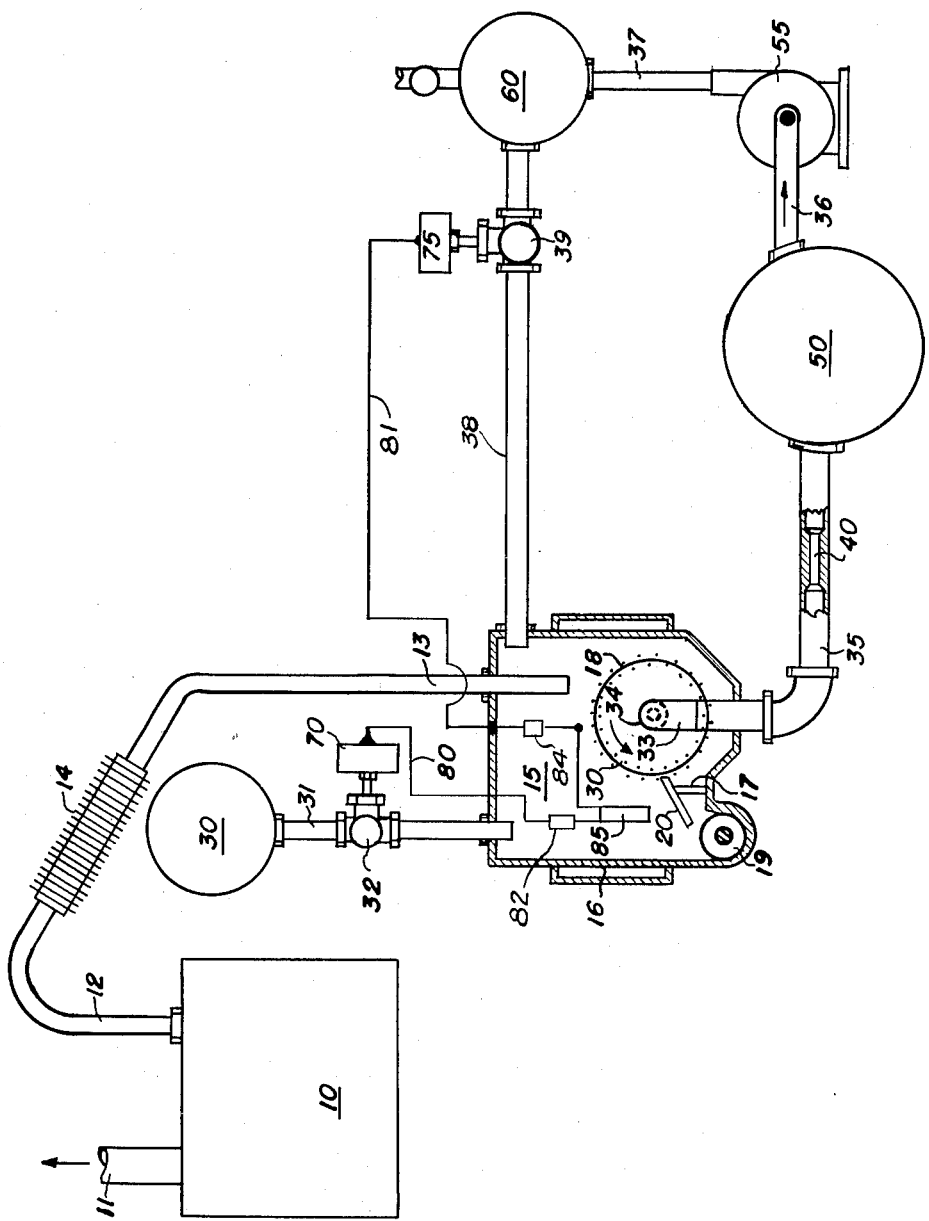

2,729,239

PROTECTIVE ARRANGEMENT

Ralph W. Baker, George W. Mattson, and Frank L. Padgitt, Baton Rouge, La., assignors to Ethyl Corporation, New York, N. Y., a corporation of Delaware Application November 6, 1952, Serial No. 319,132

3 Claims. (Cl. 137—563)

This invention relates to arrangements for protecting materials from contamination as by air. More particularly this invention relates to an improved system for filtering materials that must be shielded from contact with air.

In the production of metallic sodium by direct electrolysis of salt it is the common practice, because of the high melting point of sodium chloride (approximately 805° C.) and the relatively high vapor pressure of metallic sodium at that temperature, to add fusion temperature depressing material to the salt being electrolyzed to lower its melting point and thus enable reduction of the electrolyzing temperature and the vapor pressure of the molten sodium that is recovered. The most commonly used substance for this purpose is calcium chloride which is usually combined with the salt electrolyte in the proportions of approximately 58 to 59% $CaCl_2$ and 42 to 41% Nacl whereby the fusing point of the electrolyte is reduced to between 590° and 595° C. This additive, however, complicates the sodium recovery problem inasmuch as the sodium electrolyzed from this bath contains an appreciable amount of calcium as well as some calcium chloride and sodium chloride. To purify this sodium it is cooled to decrease the solubility of the impurities which precipitate out and can be filtered off.

In conventional operation the cooled sodium is passed through a tank provided with a filter screen through which the cooled but still molten sodium is forced by means of the application of a pressure differential of about 2 to 3 pounds per square inch (p. s. i.) of nitrogen thereacross. This molten sodium is thus forced through the filter upon which is collected the impurities.

In installations using the continuous process, the filter screen may be of the rotating drum type provided with a scraper or doctor blade and arranged to remove the filtered off solids through a discharge screw conveyor that establishes open communication to the exterior of the filter housing.

Notwithstanding the use of a protective atmosphere (nitrogen) at superatmospheric pressure within the filter tank, it has been found that appreciable oxidation of the sludge and other contents of the tank occasionally takes place, sometimes to such extent that sufficient heat is generated to endanger the entire operation. Even the application of the maximum superatmospheric pressures that the tank will safely withstand does not avoid this oxidation.

Among the objects of the instant invention is the provision of a technique for avoiding the above difficulties. Additional objects of the present invention include the provision of a foolproof sodium filtering system which will greatly reduce the possibility of contamination or combustion of the sodium by exposure to ambient air. A further object of the invention is the provision of a positive pressure system open to atmosphere and wherein a desired degree of pressure may be continuously maintained. Other and distinct objects will become apparent from the description and claims that follow.

Reference will now be made to the drawing to more particularly describe a specific example of the invention and in which the figure is a schematic view of a sodium filter embodying the present invention.

It has been discovered that the provision of a surge tank in the line supplying the protective atmosphere, together with a feed control that causes the surge tank to rapidly empty into the filter tank, enables the desired operation with minimum oxidation. It appears now that the trouble with oxidation was due to the occasional pressure changes produced when the filter screen suddenly becomes partially unclogged. The nitrogen will at that time surge rapidly through the filter, and if not replaced promptly, the surge will by its momentum alone continue the nitrogen movement till the tank pressure is reduced to a point below atmospheric pressure. When this happens air will enter the tank through any opening such as the discharge screw.

Referring now to the figure wherein exemplary apparatus for producing metallic sodium from the electrolysis of salt in a continuous process is illustrated, numeral 10 designates an electrolytic cell which may be of the "knapsack" type such as that disclosed in U. S. Letters Patent No. 1,214,808 and No. 1,186,936. A chlorine gas uptake 11 is provided at the top of the cell to convey gaseous chlorine and air mixture, liberated by the electrolytic action, to remote equipment for further processing. A second uptake or riser 12 is provided on the opposite side of the cell and is adapted to convey the molten metallic sodium, liberated by the electrolysis to a storage tank or filter chamber 15. The molten sodium is conveyed to a down-spout 13 after passing through a section of conduit which is cooled by any suitable apparatus, such as a cooling jacket 14. In the instant construction the cooling jacket is placed on an inclined section of the sodium feed conduit 12—13 in order that the crystallization of the impurities carried with the molten sodium will not result in a clogging of the conduit but will be carried along by cooled but still fluid sodium stream.

In some installations it may be desirable that the cooling apparatus 14 should be of such nature as to complete the solidification of impurities prior to discharge into the storage tank (filter chamber) 15. However, the precipitation of the impurities can be completed in the storage tank. For this purpose a second cooling jacket 16 may be provided about the storage tank.

The storage tank or filter chamber 15 is formed as an integral elongated chamber which is divided into two compartments by a vertically extending wall 17. In one of these compartments is positioned a rotary drum type filter unit of conventional design. The periphery of this drum is covered with a filtering screen 18 of extremely fine mesh which will readily pass the molten sodium but will exclude the solid impurities. The feed-pipe 13 and filter drum 18 are so positioned in the compartment that a relatively shallow pool of molten sodium is formed adjacent the bottom of the drum whereby as the drum rotates it dips into the pool and picks up a film of sodium along with adherent impurities. Suitable driving mechanism (not shown) is provided to turn the drum counterclockwise (as illustrated). As the drum rotates, the pressure system, to be subsequently described, forces the molten sodium through the filter screen 18 into the interior of the drum, leaving the impurities as a crystallized residue upon the surface of the filter.

On top of the dividing wall 17 is positioned a scraper or doctor blade 20 which is adapted to bear against the adjacent periphery of the filter screen 18 and scrape the filter residue therefrom. Suitable means (not shown) may be provided for adjusting the position of the blade 20 on the top of wall 17, and if desired to mechanically bias the edge of the blade against the periphery of the filter drum.

The residue scraped from the surface of the drum by the blade 20 is gravity fed over the inclined surface of the blade into the second compartment where it drops onto a screw type conveyor 19 positioned in the bottom portion of the compartment. This conveyor transfers the residue out of the chamber 15 to a collecting tank, or in some installations it may convey the residue directly to a press where any adherent sodium may be pressed out. Suitable driving mechanism is provided for the conveyor 19 and in a preferred form may constitute a power take-off from the drum driving mechanism so that the two may operate simultaneously and at a predetermined speed ratio.

Due to the inherent structural characteristics of the screw type conveyor it is impractical to maintain an airtight seal between the conveyor 19 and the external atmosphere. Because of this it is imperative that a positive pressure of a chemically inert gaseous medium be maintained within the chamber 15 so as to preclude any possibility of air entering the chamber through the conveyor and oxidizing the molten sodium. In practice, it is conventional to use nitrogen as such a protective blanket over the molten sodium, although other inert mediums such as helium and argon may be used.

For this purpose, a nitrogen supply tank or source 30 is directly connected to the storage tank 15 by means of a feedline 31. A control valve 32 is positioned in this feedline and is normally open to an extent sufficient to continuously supply that small proportion of nitrogen which escapes from the chamber through the exit openings of the conveyor 19. Initially the system is flushed with nitrogen and filled till a positive pressure of some amount such as approximately ½ p. s. i. is reached in the tank 15, after which the valve 32 is set to maintain this pressure.

An independent nitrogen recirculating system is provided to cooperate with the filter chamber 15 and includes a filtrate line 35, a sodium collector drum 50, a pump feedline 36, a low pressure pump 55, a pump discharge line 37, a surge tank 60, and a nitrogen return line 38. The filtrate line 35 is connected to the interior of the filter drum 18 by means of a sealed elbow coupling 34 and a dependent suction pipe 33 that extends down to near the bottom of the drum interior. This construction enables the pump 55 to suck sodium from the interior of the filter drum. The pump 55 can be set to produce a suction of approximately 1.5 to 2.5 p. s. i. so that a differential pressure of between about 2 and 3 p. s. i. is maintained across the filter screen 18.

The mixture of molten sodium and nitrogen drawn into the filtrate line 35 is conveyed to the sodium collecting drum 50 where the sodium is trapped, the nitrogen being drawn through line 36 to the pump 55 and then rushed through the line 37 to the surge tank 60 where it is accumulated.

The tank 60 is connected by a return line 38 to the filter tank 15 and includes a control valve 39 which in normal operation is opened to a sufficient extent to permit the pump to maintain a constant recirculation of the nitrogen back into the chamber 15 while maintaing a reserve supply of nitrogen in the surge tank 60 under a relatively high pressure, as for example approximately 2 to 5 p. s. i. It will thus be appreciated that under conditions of normal operation, the feedline 32 is utilized to supply only a slight excess amount of nitrogen to the system while the recirculating system maintains a continuous flow therein.

In accordance with the present invention, a control system is provided to automatically open valve 39 when the pressure around drum 18 falls unduly. As shown, a sensing unit 85, which is electrically connected to a valve operating mechanism 70 and to the valve 32 by wiring 80, and electrically connected to the valve operating mechanism 75 for the valve 39 by the wiring 81 is preferably positioned in the storage tank 15. The sensing unit 85 is connected to a pressure differential switch 84 which will energize the valve operating mechanism 75 upon a drop in pressure within the tank 15 to below a predetermined value, which may be ³⁄₁₀ p. s. i. A time delay switch 82 is also positioned in the storage tank 15 in the wiring 80 between the sensing unit 85 and the valve operating mechanism 70 which will energize the valve operating mechanism 70 when the pressure within the chamber 15 remains below operating pressure for a predetermined period of time, as for example three to ten seconds. The valves can be operated pneumatically or hydraulically if desired.

The two control units 70 and 75 are preferably of the trip operating type and when energized via the control unit 85 snap each valve, 32 and 39 respectively, fully open.

The function and operation of the system is as follows. Upon a sudden unclogging of the filter screen 18 and an attendant surge of nitrogen from the chamber 15, the unit 85 energizes the servo 75 to fully open valve 39 and dump the full supply of the surge tank 60 into the chamber 15. In most cases this action will suffice to maintain a positive pressure in the filter chamber and prevent ingress of air, the pump 55 subsequently restoring the excess nitrogen in the surge tank 60 to return the system to equilibrium. However, should sequential surges occur within the chamber 15 in such rapid succession that the surge tank 60 has not be refilled by the pump 55, and the pressure within the chamber is reduced to a dangerously low level, the unit 85 energizes servo 70 to supply an excess of nitrogen from the source 30 and positively preclude the maintenance of combustion supporting conditions. This latter control system also provides protection against unexpected leaks. For this purpose a suitable alarm system may be provided to operate in unison with operator 70 to show that excess nitrogen is being used.

A further precautionary measure which may be taken is the provision of a restriction 40 in the filtrate line 35 which serves to block and slow down surges from within the filter drum 18. This need not be used, however, inasmuch as a surge tank of sufficient capacity connected by a line 38 that can deliver gas rapidly will usually take care of all situations. Furthermore, an effect similar to that of the restriction 40 can be obtained by reducing the gas capacity of collection drum 50.

The screw conveyor 19 and the solids contents therein will normally provide sufficient back pressure on the system to maintain a sufficient working pressure in the chamber 15, and prevent an undue escape of the inert atmosphere therefrom. This back pressure is primarily dependent upon the diameter and length of the conveyor proper. In certain cases, however, the solids may tend to clog or plug the conveyor, necessitating the use of a larger conveyor. When desired for this or other reasons, a partial seal or valve can be provided at the discharge end of the screw conveyor to increase the back pressure thereof and thus permit increased pressures within the chamber.

The filter of this invention has been described with particular reference to filter high sodium feeds containing solids impurities. In practice, it is frequently desirable to separate the major quantities of the sodium metal by a simple settling technique. The sludge so obtained, containing substantially lower concentrations of sodium, can then be fed directly into the filter chamber, or in some cases, can be first solidified for storage and subsequently remelted prior to treatment in the filter apparatus of this invention.

From the above disclosure it will be readily appreciated that the instant invention provides a completely automatic, self-sustaining and self-monitoring nitrogen circulation system which effectively maintains a protective atmosphere in the system even though it has no positive seal and is open to the air.

Alternatively, the storage tank, whether of the type used in a continuous process or not, may be provided with a temperature controlling jacket (such as 16 of the figure) and suitable control connections between the temperature responsive unit and the jacket whereby the temperature within the filter chamber may be maintained within a predetermined range.

Obviously, the nitrogen circulating system could be operated, if so desired, with only the pressure responsive control units connected to control valves.

Further, the automatic, self-sustaining and self-monitoring pressure systems of the instant invention need not be confined to a sodium or sludge filtration installation but may be used in various other installations which are left unsealed to ambient air or other fluid.

As many apparently widely different embodiments of this invention may be made without departing from the spirit and scope hereof, it is to be understood that the invention is not limited to the specific embodiment hereof, except as defined in the appended claims.

What is claimed is:

1. A protective fluid pressure system for treating easily oxidizable materials comprising a chamber to be maintained under a predetermined gas pressure and having a restricted opening to atmosphere, the degree of restriction being subject to wide and sudden variations; a pressure responsive control means positioned within said chamber; a time delay means; a source of gas pressure; a gas supply conduit connecting the said source to said chamber; a feed valve controlling the flow of gas from said source to said chamber and normally permitting the continuous flow of a limited quantity of gas thereto; a feed valve operating mechanism controlling the operation of said feed valve, said mechanism being connected to said pressure responsive means through said time delay means to open said valve and supply additional gas to said chamber in the event of a prolonged low pressure in said chamber; a recirculating circuit for supplying gas to said chamber upon a sudden decrease in pressure therein, said circuit being connected to said chamber at different places to form a closed gas circuit therewith, said recirculating circuit including a conduit, a gas circulating pump, a gas surge reservoir on the discharge side of said pump and a control valve between said reservoir and said chamber, and a control valve operating mechanism controlling the operation of said control valve, said latter mechanism being connected to said pressure responsive control means and responsive thereto to supply gas to said chamber from said gas surge reservoir upon sudden decreases in pressure in said chamber.

2. Apparatus of claim 1, wherein the pressure responsive control means admits gas from said reservoir to said chamber when the pressure drop within said chamber is about 0.3 pound per square inch below the normal operating pressure.

3. The apparatus of claim 1, wherein the time delay for supplying additional gas from said pressure gas source to said chamber is between about 3 and 10 seconds.

References Cited in the file of this patent

UNITED STATES PATENTS

| | | |
|---|---|---|
| 1,512,321 | Wait | Oct. 21, 1924 |
| 2,081,398 | Giles | May 25, 1937 |
| 2,439,793 | Braddon | Apr. 20, 1948 |